United States Patent Office 3,449,331
Patented June 10, 1969

3,449,331
NOVEL 2,6-METHANOBENZAZOCINES
AND PROCESSES
Frank H. Clarke, Jr., Armonk, and Fred B. Block, Hartsdale, N.Y., assignors to Geigy Chemical Corporation, Ardsley, N.Y., a corporation of New York
No Drawing. Continuation-in-part of application Ser. No. 453,472, May 5, 1965. This application Feb. 27, 1967, Ser. No. 619,002
Int. Cl. C07d 29/02; A61k 27/00
U.S. Cl. 260—240                                6 Claims

ABSTRACT OF THE DISCLOSURE

Analgesic 3-(thienyl- and furanylalkyl and -alkenyl)-6-phenyl-1,2,3,4,5,6-hexahydro-2,6-methano-3 - benzazocine derivatives are prepared via the reaction of an N-unsubstituted 6 - phenyl - 1,2,3,4,5,6-hexahydro-2,6-methano-3-benzazocine derivative and thienylalkyl or furanalkyl or alkenyl bromide or the corresponding chloride. A typical embodiment is 3-[2-(α-thienyl)ethyl]-6-phenyl-1,2,3,4,5, 6-hexahydro-2, 6-methano-3-benzazocine-8-ol.

CROSS REFERENCE

This is a continuation-in-part of copending application Ser. No. 453,472, filed May 5, 1965, now abandoned.

DETAILED DESCRIPTION

This invention relates to novel organic compounds, to novel methods for their preparation and use and to the novel intermediates prepared and employed in their preparation. In particular the present invention relates to certain 6 - phenyl-1,2,3,4,5,6-hexahydro-2,6-methano-3-benzazocines (alternatively named as 5-phenyl-6,7-benzomorphans) substituted in the 3 position by a thienylalkyl or furanyl-alkyl or -alkenyl group, and to the pharmaceutically acceptable non-toxic acid addition salts thereof.

The compounds of the present invention are represented by the following structural formula:

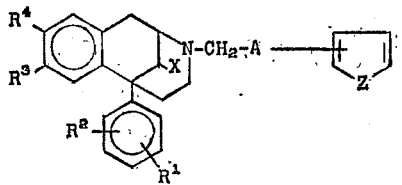

(I)

wherein each of $R^1$ and $R^2$, independent of the other is hydrogen, halogen, (lower)alkyl, (lower)alkoxy, (lower)alkanoyloxy, hydroxy or trifluoromethyl; each of $R^3$ and $R^4$, independent of the other, is hydrogen, hydroxy, (lower)alkoxy; or (lower)alkanoyloxy; Z is divalent oxygen or divalent sulfur; X is hydrogen or (lower)alkyl; and A is methylene, ethylene, ethylidene or vinylene.

By the term "(lower)alkoxy," "(lower)alkanoyloxy" and the like is intended a group comprising a branched or straight hydrocarbon chain containing from one to six carbon atoms. Representative of (lower)alkyl groups are thus methyl, ethyl, propyl, i-propyl, butyl, s-butyl, t-butyl, pentyl, isopentyl, hexyl and the like. Embraced by lower alkoxy are groups containing from one to six carbon atoms and joined through an oxygen ether bond such as methoxy, ethoxy, i-propoxy, butoxy and the like. It is to be understood that when the nature of any particular functional group in these moieties requires two carbon atoms, the hydrocarbon portion of the moiety will have from two to seven carbon atoms. Thus "(lower)alkanoyloxy" is typified by acetoxy, propanoyloxy, butanoyloxy, pentanoyloxy, hexanoyloxy and the like.

With greater particularity to Formula I, the phenyl group in the 6 position of the fundamental benzazocine nucleus may be unsubstituted, e.g., $R^1$ and $R^2$ are both hydrogen; monosubstituted, e.g. one of $R^1$ and $R^2$ is hydrogen and the other is a group other than hydrogen; or disubstituted, e.g., both $R^1$ and $R^2$ are groups other than hydrogen. $R^1$ and $R^2$ may be but are not necessarily the same.

Similarly the groups designated by $R^3$ and $R^4$ in the benzo moiety of the fundamental benzazocine nucleus may be the same or different groups. While both may be hydrogen, the preferred embodiment is characterized by $R^3$ being hydroxy or a derivative thereof, e.g., alkoxy or alkanoyloxy, and $R^4$ being hydrogen. Other combinations however, falling within the scope of Formula I are also contemplated.

X may be hydrogen or (lower)alkyl, preferably methyl, although any alkyl group of from one to six carbon atoms as described above is embraced. The alkyl group may be of the axial or equatorial orientation.

The group Z may be oxygen or sulfur, thus constituting a furanyl or thienyl ring. This ring may be bound, on either its α or β position, to the remainder of the molecule through an ethylene (A=methylene), 1,3-propylene (A=ethylene); 1,2-propylene (A=ethylidene); or a 1,3-prop-2-enylene (A=vinylene) chain.

The compounds of the present invention possess analgesic and antitussive activity. Moreover, under suitable conditions, the compounds of the present invention demonstrate narcotic antagonism.

These compounds may be administered parenterally or orally for the treatment of pain in any of the usual pharmaceutical forms including tablets, capsules, powders, suspensions, solutions, syrups and the like. Particularly valuable formulations include sustained release preparations which may be compounded by any of the known procedures. Generally these compounds are effective in effecting analgesia at a dosage of from about .1 to about .5 mg. per kg. of body weight. As with any analgesic agent, the dosage should be adjusted to the severity of the indication and the degree of response. Moreover the dose may be repeated as appropriate depending upon the nature of the particular formulation, the response and the condition of the patient.

Since the compounds of the instant invention possess an amino group, various obvious derivatives may be made without departing from the spirit of the present invention. For example, various quaternary salts such as the methiodide may be prepared. So, too, the N-oxides of the instant compounds demonstrate important properties.

A particularly valuable embodiment of the present invention includes the acid addition salts prepared from pharmaceutically acceptable non-toxic acids. Such pharmaceutically acceptable non-toxic acid addition salts include those derived from organic and inorganic acids such as, without limitation, hydrochloric, hydrobromic, sulfuric, phosphoric, methanesulfonic, acetic, lactic, succinic, malic, maleic, aconitic, phthalic tartaric embonic and like acids.

The compounds of the present invention are prepared by treating a compound of the formula:

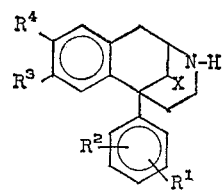

(II)

with a compound of the formula

wherein Y is chloro or bromo, in the presence of an acid binding agent, such as an alkali bicarbonate, in an inert, nonaqueous, organic solvent such as dimethylformamide at elevated temperatures, e.g., at reflux temperatures.

The requisite starting materials of Formula II may be prepared according to the procedures described in U.S. Patent No. 3,320,265.

The requisite starting materials of Formula III are either known or may be obtained from the corresponding acids through reduction, as with lithium aluminum hydride, and halogenation of the resultant alcohols, as with phosphorus tribromide.

Alternatively a compound of Formula II is treated with an acid chloride of an acid of the formula:

and the resulting amide then reduced with a metal hydride such as lithium aluminum hydride.

8-acyloxy derivatives are obtained via conventional esterification of the corresponding 8-hydroxy derivatives, as with an acid anhydride.

As can be seen from Formula I, the compounds of the present invention may exist in at least two optical isomers. Thus the presence of an "asymmetric" carbon atom in the benzazocine nucleus, and in certain instances, on the alkylene bridge; results in the existence of d- and l-optical isomers. In addition, when X in Formula I is alkyl, stereoisomers are possible, the alkyl group being cis or trans to the phenyl group in position 6. In each of these instances, however, the geometric or stereoisomers are obtained via use of the appropriate starting material or a mixture of isomers is separated by taking advantage of differences in their properties, e.g., by fractional crystallization or distillation. When it is desirable to resolve enantiomorphs, the standard formation or diastereoisomeric salts by the use of an optically active acid is employed. All such isomeric forms are within the purview of the present invention (including the d- and l-forms of each of the α(cis) and β(trans) isomers when X is alkyl).

The following examples, presented for purposes of illustration and not limitation, will serve to further typify the nature of this invention.

PREPARATIONS (a) To a suspension of 5.6 g. of lithium aluminum hydride in 100 ml. of dry tetrahydrofuran are added, under anhydrous conditions, 2.5 g. of ethyl α-thienylacetate (obtained from ethanol and α-thienylacetic acid via conventional esterification conditions) in 50 ml. of tetrahydrofuran. The mixture is refluxed for 15 hours, cooled and decomposed via the cautious addition of saturated aqueous sodium chloride solution. This mixture is refluxed briefly, cooled and filtered. The filtrate is concentrated in vacuo and the residue recrystallized from ether to yield 1-(α-thienyl)-2-ethanol.

(b) To 12.8 g. of 1-(α-thienyl)-2-ethanol is added at 0° in a dropwise fashion, a solution of 21.0 g. of phosphorus tribromide in 10 ml. of anhydrous benzene. An additional 50 ml. of dry benzene are then added and the solution is heated for 1 hour on a hot water bath. The mixture is cooled on an icebath and 60 ml. of ice-water are cautiously added. The benzene layer is washed with water and 2 N sodium carbonate. Ether is added to dissipate the emulsion and the organic layer is separated, filtered, dried over anhydrous magnesium, and evaporated to dryness to yield 1-(α-thienyl)-2-bromoethane as a yellow liquid.

In a similar fashion there are obtained 1-(β-thienyl)-2-bromoethane, 1-(α-furanyl)-2-bromoethane, 1-(β-furanyl)-2-bromoethane, 2-(β-thienyl)-1-bromopropane and 3-(α-furanyl)-1-bromopropane.

Example 1.—d,1-3-[2-(α-thienyl)ethyl]-6-phenyl-1,2,3,4,5,6-tetrahydro-2,6-methano-3-benzazocine-8-ol hydrochloride A mixture of 2.20 g. of 6-phenyl-1,2,3,4,5,6-hexahydro-2,6-methano-3-benzazocine-8-ol, 2.36 g. of 1-(α-thienyl)-2-bromoethane, 0.82 g. of sodium carbonate and 50 ml. of dimethylformamide is heated at 155° C. for five hours. At the end of this time the solution is evaporated to dryness and the solid extracted with water. The brown residual solid is stirred in 60 ml. of hot ethanol, then slurried in 60 ml. of methanol, and finally treated with alcoholic hydrochloric acid until acidic to congo red paper. A tan solid is isolated, dissolved in hot methanol, clarified with charcoal and cooled to yield 1.21 g. of the product as a white solid, M.P. 317.0–317.5°. Addition of ether to the mother liquor yielded an additional 0.37 g. (12% yield) of product M.P. 310.0–312.0°.

Similarly, by employing the resolved enantiomorphs of the benzazocine starting material, there are obtained d-3-[2-(α-thienyl)ethyl]-6-phenyl-1,2,3,4,5,6-tetrahydro-2,6-methano-3-benzazocine-8-ol and 1-3-[2-(α-thienyl)ethyl]-6-phenyl-1,2,3,4,5,6-tetrahydro-2,6-methano-3-benzazocine-8-ol.

Example 2

In a similar fashion to that described in Example 1, the following compounds are substituted for 6-phenyl-1,2,3,4,5,6-hexahydro-2,6-methano-3-benzazocine-8-ol:

6-(4-chlorophenyl)-1,2,3,4,5,6-hexahydro-2,6-methano-3-benzazocine-8-ol;
6-(4-hydroxyphenyl)-1,2,3,4,5,6-hexahydro-2,6-methano-3-benzazocine-8-ol;
6-(2,3-dimethoxyphenyl)-1,2,3,4,5,6-hexahydro-2,6-methano-3-benzazocine;
6-(3,4-dihydroxyphenyl)-1,2,3,4,5,6-hexahydro-2,6-methano-3-benzazocine-8-ol;
6-(3-trifluoromethylphenyl)-1,2,3,4,5,6-hexahydro-2,6-methano-3-benzazocine-8-ol;
6-(4-methylphenyl)-1,2,3,4,5,6-hexahydro-2,6-methano-3-benzazocine-8-ol;
6-phenyl-11-methyl-1,2,3,4,5,6-hexahydro-2,6-methano-3-benzazocine;
6-phenyl-8-methoxy-11-methyl-1,2,3,4,5,6-hexahydro-2,6-methano-3-benzazocine;
6-phenyl-11-methyl-1,2,3,4,5,6-hexahydro-2,6-methano-3-benzazocine-8-ol;
6-phenyl-8-methoxy-1,2,3,4,5,6-hexahydro-2,6-methano-3-benzazocine; and
6-phenyl-1,2,3,4,5,6-hexahydro-2,6-methano-3-benzazocine.

There are thus respectively obtained the following compounds:

3-[2-(α-thienyl)ethyl]-6-(4-chlorophenyl)-1,2,3,4,5,6-hexahydro-2,6-methano-3-benzazocine-8-ol;
3-[2-(α-thienyl)ethyl]-6-(4-hydroxyphenyl)-1,2,3,4,5,6-hexahydro-2,6-methano-3-benzazocine-8-ol;
3-[2-(α-thienyl)ethyl]-6-(2,3-dimethoxyphenyl)1,2,3,4,5,6-hexahydro-2,6-methano-3-benzazocine;
3-[2-(α-thienyl)ethyl]-6-(3,4-dihydroxyphenyl)-1,2,3,4,5,6-hexahydro-2,6-methano-3-benzazocine-8-ol;
3-[2-(α-thienyl)ethyl]-6-(3-trifluoromethylphenyl-1,2,3,4,5,6-hexahydro-2,6-methano-3-benzazocine-8-ol;
3-[2-(α-thienyl)ethyl]-6-(4-methylphenyl)-1,2,3,4,5,6-hexahydro-2,6-methano-3-benzazocine-8-ol;
3-[2-(α-thienyl)ethyl]-6-phenyl-11-methyl-1,2,3,4,5,6-hexahydro-2,6-methano-3-benzazocine;
3-[2-(α-thienyl)ethyl]-6-phenyl-8-methoxy-11-methyl-1,2,3,4,5,6-hexahydro-2,6-methano-3-benzazocine;

3-[2-(α-thienyl)ethyl]-6-phenyl-11-methyl-1,2,3,4,5,6-
  hexahydro-2,6-methano-3-benzazocine-8-ol;
3-[2-(α-thienyl)ethyl]-6-phenyl-8-methoxy-1,2,3,4,5,6-
  hexahydro-2,6-methano-3-benzazocine; and
3-[2-(α-thienyl)ethyl]-6-phenyl-1,2,3,4,5,6-hexahydro-
  2,6-methano-3-benzazocine.

Example 3

The following compounds are substituted in equivalent amounts for 1-(α-thienyl)-2-bromoethane in the procedure of Example 1:

1-(β-thienyl)-2-bromoethane, 1-(α-furanyl)-2-bromoethane, 1-(α-furanyl)-2-bromoethane, 1-(β-furanyl)-2-bromoethane, 2-(β-thienyl)-1-bromopropane and 3-(α-furanyl)-1-bromopropane. There are thus respectively obtained the following compounds:

3-[2-(β-thienyl)ethyl]-6-phenyl-1,2,3,4,5,6-hexahydro-
  2,6-methano-3-benzazocine-8-ol;
3-[2-(α-furanyl)ethyl]-6-phenyl-1,2,3,4,5,6-hexahydro-
  2,6-methano-3-benzazocine-8-ol;
3-[2-(β-furanyl)ethyl]-6-phenyl-1,2,3,4,5,6-hexahydro-
  2,6-methano-3-benzazocine-8-ol;
3-[2-(β-thienyl)propyl]-6-phenyl-1,2,3,4,5,6-hexahydro-
  2,6-methano-3-benzazocine-8-ol; and
3-[3-(α-furanyl)ethyl]-6-phenyl-1,2,3,4,5,6-hexahydro-
  2,6-methano-3-benzazocine-8-ol.

Example 4

By substituting 3-(α-thienyl)allyl bromide, 3-(β-thienyl)allyl bromide and 3-(α-furanyl)allyl bromide (obtained from the corresponding allyl alcohols via the procedure of part (b) of the preparations) for 1-(α-thienyl)-2-bromoethane in the procedure of Example 1, the following compounds are respectively obtained:

3-[3-(α-thienyl)prop-2-en-1-yl]-6-phenyl-1,2,3,4,5,6-
  hexahydro-2,6-methano-3-benzazocine-8-ol;
3-[3-(β-thienyl)prop-2-en-1-yl]-6-phenyl-1,2,3,4,5,6-
  hexahydro-2,6-methano-3-benzazocine-8-ol; and
3-[3-(α-furanyl)prop-2-en-1-yl]-6-phenyl-1,2,3,4,5,6-
  hexahydro-2,6-methano-3-benzazocine-8-ol.

Example 5.—3-[2-(α-thienyl)ethyl]-6-phenyl-8-acetoxy-1,2,3,4,5,6-hexahydro-2,6-methano-3-benzazocine Eight grams of 3-[2-(α-thienyl)ethyl]-6-phenyl-1,2,3,4,5,6-hexahydro-2,6-methano-3-benzazocine-8-ol (as the hydrochloride) and 50 ml. of acetic anhydride are heated at 100° C. for one hour. The solution is cooled, rendered basic with dilute sodium hydroxide. The solid collected upon filtration is dissolved in ether and this solution is filtered, dried over sodium sulfate and evaporated to yield 3-[2-(α-thienyl)ethyl]-6-phenyl-8-acetoxy-1,2,3,4,5,6-hexahydro-2,6-methano-3-benzazocine.

Example 6

An aqueous solution suitable for injection is prepared as follows:

3-[2-(β-thienyl)ethyl] - 6 - phenyl-1,2,3,4,5,6-hexa-
  hydro-2,6-methano - 3 - benzazocine-8-ol hydro-
  chloride _____mg__ 100
Sodium citrate _____mg__ 37
Sodium chloride _____mg__ 10
Propylene glycol _____ml__ .15
Sterile distilled water, q.s. 100 ml.

Aliquots of the above solution suitable to deliver the desired dosage of the active ingredient are administered intramuscularly for relief of pain.

Example 7

Ingredient:                                Quantity/capsule, mg.
3-[2-(β-furanyl)ethyl] - 6 - phenyl-1,2,3,4,5,6-
  hexahydro - 2,6 - methano - 3 - benzazocine-
  8-ol _____ 10
Corn starch, U.S.P. _____ 290

The above ingredients are mixed and introduced into a two-piece hard gelatin No. 1 capsule. One such capsule is suitable for oral administration every three hours to deliver 10 mg. of active ingredient.

Example 8

Ingredient:                                Quantity/capsule, mg.
3-[2-(α-furanyl)ethyl] - 6 - phenyl-1,2,3,4,5,6-
  hexahydro-2,6-methano - 3 - benzazocine-
  8-ol _____ 10
Corn starch, U.S.P. _____ 150
Lactose, U.S.P. _____ 180
Cab-O-Sil M–5 _____ 4
Gelatin, U.S.P. _____ 5
Magnesium stearate, U.S.P. _____ 1

The foregoing ingredients are thoroughly mixed and pressed into tablets suitable for oral administration of 10 mg. of active ingredient. The tablets may be scored to permit administration of fractional doses.

Example 9

A solution suitable for injection is prepared containing in each ml., 0.2 mg. of 3-[2-(α-thienyl)ethyl]-6-phenyl-11-methyl-1,2,3,4,5,6-hexahydro - 2,6 - methano-3-benzazocine-8-ol hydrochloride, 15 mg. of sodium citrate, 2.2 mg. of sodium bisulfite as a preservative and sterile distilled water, q.s. 1 ml.

Example 10

A solution of 3-[2-(α-thienyl)ethyl]-6-phenyl-1,2,3,4,5,6-hexahydro-2,6-methano-3-benzazocine-8-ol in methanol, heated if necessary, is treated with a molar equivalent amount of maleic acid in methanol. The mixture is warmed briefly, cooled and concentrated. The solid which forms is collected by filtration, washed with a little cold methanol and dried to yield 3-[2-(α-thienyl)ethyl]-6-phenyl-1,2,3,4,5,6-hexahydro - 2,6 - methano-benzazocine-8-ol maleate.

Other salts such as the tartrate, succinate, citrate and the like are formed in an analogous fashion.

What is claimed is:

1. A compound selected from the group consisting of a 1,2,3,4,5,6-hexahydro-6-phenyl-2,6-methano-3-benzazocine of the formula:

wherein
  each of $R^1$ and $R^2$ independent of the other, is hydrogen, halogen, (lower)alkyl, (lower)alkoxy, (lower)alkanoyloxy, hydroxy or trifluoromethyl;
  each of $R^3$ and $R^4$, independent of the other is hydrogen, hydroxy, (lower)alkoxy, or (lower)alkanoyloxy;
  Z is divalent oxygen or divalent sulfur;
  X is hydrogen or (lower)alkyl; and
  A is vinylene.

2. A compound according to claim 1 wherein each of $R^2$ and $R^4$ is hydrogen.

3. A compound according to claim 1 wherein the compound is 3-[3-(α-thienyl)prop-2-en-1-yl]-6-phenyl-1,2,3,4,5,6-hexahydro-2,6-methano-3-benzazocine-8-ol.

4. A compound according to claim 1 wherein the compound is 3-[3-(β-thienyl)prop-2-en-1-yl]-6-phenyl-1,2,3,4,5,6-hexahydro-2,6-methano-3-benzazocine-8-ol.

5. A compound according to claim 1 wherein the compound is 3-[3-(α-furanyl)prop-2-en-1-yl]-6-phenyl-1,2,3,4,5,6-hexahydro-2,6-methano-3-benzazocine-8-ol.

6. The pharmaceutically acceptable nontoxic acid addition salts of a compound according to claim 1.

References Cited
UNITED STATES PATENTS

| | | | |
|---|---|---|---|
| 2,924,603 | 2/1960 | Gordon | 260—293.4 |
| 3,320,265 | 5/1967 | Clarke | 260—240 XR |

JOHN D. RANDOLPH, *Primary Examiner.*

U.S. Cl. X.R.

260—293.4, 294, 294.7, 332.2, 332.3, 332.5, 346.1, 347.5, 347.8; 424—267